US011938062B2

(12) United States Patent
Lockridge

(10) Patent No.: US 11,938,062 B2
(45) Date of Patent: Mar. 26, 2024

(54) FOLDABLE SURVIVAL STRETCHER

(71) Applicant: Margaret Ann Lockridge, Rancho Mirage, CA (US)

(72) Inventor: Margaret Ann Lockridge, Rancho Mirage, CA (US)

( * ) Notice: Subject to any disclaimer, the term of this patent is extended or adjusted under 35 U.S.C. 154(b) by 0 days.

(21) Appl. No.: 18/345,325

(22) Filed: Jun. 30, 2023

(65) Prior Publication Data

US 2024/0000639 A1 Jan. 4, 2024

Related U.S. Application Data

(60) Provisional application No. 63/367,431, filed on Jun. 30, 2022.

(51) Int. Cl.

*A61G 1/013* (2006.01)
*A61G 1/04* (2006.01)
*A61G 1/044* (2006.01)
*A61G 1/048* (2006.01)

(52) U.S. Cl.

CPC ............. *A61G 1/013* (2013.01); *A61G 1/044* (2013.01); *A61G 1/048* (2013.01); *A61G 1/04* (2013.01)

(58) Field of Classification Search

CPC .......... A61G 1/013; A61G 1/04; A61G 1/044; A61G 1/048
USPC ............................................ 5/627, 625, 628
See application file for complete search history.

(56) References Cited

U.S. PATENT DOCUMENTS 722,456 A * 3/1903 Reeves .................. A61G 1/013 5/628
879,335 A * 2/1908 Southmayd ............ A61G 1/013 5/187
2,788,530 A * 4/1957 Ferguson ................. A61G 1/01 5/628
3,775,782 A * 12/1973 Rice ......................... A61G 1/00 128/DIG. 20

(Continued)

FOREIGN PATENT DOCUMENTS

WO WO-2005049143 A2 * 6/2005 ............. A47G 9/086
WO WO-2012080824 A1 * 6/2012 ............. A61G 1/013
WO WO-2018122594 A1 * 7/2018 ............... A61G 1/01

OTHER PUBLICATIONS

Mfcinternational, Inflatable Stretcher. Retrieved From Internet, Retrieved On Jun. 30, 2023, <URL: https://www.mfc-international.com/home/products/water-rescue/inflatable-stretcher>.

*Primary Examiner* — Robert G Santos

(57) ABSTRACT

A foldable survival stretcher is an apparatus that enables the user to carry an injured person without help from another person during emergencies. The apparatus is a practical stretcher that can be easily and quickly deployed so that the user can transport the injured person to safety in various emergency situations. The apparatus includes a stretcher canvas, a pair of pulling straps, a head-restraining band, a chest-retraining band, a pelvis-restraining band, and a feet-restraining pocket. The stretcher canvas is a resilient structure able to support the injured person while the user carries the injured person using the apparatus. The pair of pulling straps enables the user to carry the stretcher canvas like a backpack. The head-restraining band, the chest-restraining band, and the pelvis-restraining band help secure the injured person to the stretcher canvas. The feet-restraining pocket (Continued)

also helps secure the feet of the injured person to the stretcher canvas.

18 Claims, 9 Drawing Sheets

(56) References Cited

U.S. PATENT DOCUMENTS

| | | | | | |
|---|---|---|---|---|---|
| RE28,916 | E * | 7/1976 | Rice | A61G 1/00 5/628 |
| 4,124,908 | A * | 11/1978 | Burns | A61F 5/3776 5/628 |
| 4,151,842 | A * | 5/1979 | Miller | A61F 5/05883 5/628 |
| 4,186,453 | A * | 2/1980 | Burns | A61G 7/0504 5/628 |
| 4,601,075 | A * | 7/1986 | Smith | A61G 1/044 5/628 |
| 4,621,382 | A * | 11/1986 | Burriss | B63C 9/08 5/628 |
| 4,736,474 | A * | 4/1988 | Moran | A61G 1/007 5/628 |
| 5,150,487 | A * | 9/1992 | Hemphill | A61G 7/0504 5/628 |
| 5,179,746 | A * | 1/1993 | Rogers | A61G 1/0231 5/628 |
| 5,189,746 | A * | 3/1993 | Horie | A61G 1/01 5/628 |
| 5,211,186 | A * | 5/1993 | Shoemaker | A61G 1/044 5/628 |
| 5,720,303 | A * | 2/1998 | Richardson | A61G 1/01 128/870 |
| 5,839,137 | A * | 11/1998 | Butler | A61G 1/01 5/89.1 |
| 6,477,728 | B1 * | 11/2002 | Faz | A61G 1/013 128/870 |
| 7,962,983 | B2 * | 6/2011 | Keesaer | A61G 1/048 5/628 |
| 8,528,137 | B2 * | 9/2013 | Johnson | A61G 1/01 5/628 |
| 8,615,829 | B2 * | 12/2013 | Kenalty | A61G 1/02 5/628 |
| 8,677,530 | B2 * | 3/2014 | Calkin | A61G 1/01 5/628 |
| 8,782,833 | B2 * | 7/2014 | Beurguet | A62B 31/00 5/628 |
| 9,757,286 | B2 * | 9/2017 | Beaulieu | A61G 1/044 |
| 9,861,539 | B1 | 1/2018 | Stickler et al. | |
| 10,285,888 | B2 | 5/2019 | Liu | |
| 10,932,963 | B2 * | 3/2021 | Kenalty | A61G 1/048 |
| 11,344,457 | B2 * | 5/2022 | Calkin | A61G 1/042 |
| 2002/0162171 | A1 * | 11/2002 | Faz | A61G 1/013 5/625 |
| 2003/0106155 | A1 * | 6/2003 | Arai | A61G 1/00 5/625 |
| 2006/0213011 | A1 * | 9/2006 | McLoughlin | A61G 1/00 5/628 |
| 2007/0136950 | A1 * | 6/2007 | Zuercher | A61G 7/0504 5/627 |
| 2010/0199434 | A1 * | 8/2010 | Keesaer | A61G 1/048 5/628 |
| 2010/0299837 | A1 * | 12/2010 | Yandle | B63C 9/02 5/628 |
| 2011/0271450 | A1 * | 11/2011 | Johnson | A61G 1/044 5/626 |
| 2012/0151679 | A1 * | 6/2012 | Kenalty | A61G 1/013 5/628 |
| 2012/0291203 | A1 * | 11/2012 | Beurguet | A62B 31/00 5/706 |
| 2014/0053335 | A1 * | 2/2014 | Calkin | A61G 1/044 5/628 |
| 2015/0143634 | A1 * | 5/2015 | Beaulieu | A61G 1/044 5/628 |
| 2015/0283007 | A1 | 10/2015 | Carlson | |
| 2018/0177649 | A1 * | 6/2018 | Kenalty | A61G 1/01 |
| 2021/0015689 | A1 * | 1/2021 | Calkin | A61G 1/048 |
| 2021/0169713 | A1 * | 6/2021 | Kenalty | A61G 1/02 |
| 2021/0177677 | A1 * | 6/2021 | Kenalty | A61G 1/013 |

* cited by examiner

FOLDABLE SURVIVAL STRETCHER

The current application claims a priority to the U.S. provisional patent application Ser. No. 63/367,431 filed on Jun. 30, 2022.

FIELD OF THE INVENTION

The present invention relates generally to medical equipment and emergency supplies. More specifically, the present invention provides a foldable survival stretcher that can be deployed by a user in various emergency situations to transport an injured person without assistance from another person.

BACKGROUND OF THE INVENTION

In general, stretchers are devices used for safely transporting an injured person to a location where the injured person can receive medical care. Traditional stretchers are rigid to fully support the injured and require multiple people to carry the injured. In addition, foldable stretchers have been made available to be used in various situations where stretchers need to be compactly stored for easy transportation and to be deployed at any moment, such as in combat situations. These foldable stretchers, while practical, still require at least two people to carry the injured on the stretcher. This limitation of currently available stretchers results in many disadvantages. For example, most stretchers can be difficult to use in irregular or elevated terrain, such as going down a flight of stairs. In addition, the traditional design of stretchers can leave the people carrying the injured vulnerable, especially in combat situations. There have been improvements to traditional stretchers that facilitate the transportation of injured people during emergency situations. For example, modern stretchers can be designed to be mounted onto a wheeled base to enable the quick transportation of injured people. Similarly, foldable stretchers have been equipped with several handles that enable several people to hold onto the stretcher in more comfortable ways when transporting the injured person. However, these improvements do not fix the inconveniences and inefficiencies of currently available stretchers when used in various emergency situations.

An object of the present invention is to provide a foldable survival stretcher that facilitates the user to single-handedly carry an injured person on any type of terrain during emergency situations. The present invention is designed to enable a person to comfortably carry an injured person without assistance from another person during emergencies. Another objective of the present invention is to provide a foldable survival stretcher that can be used in various emergency situations without hindering the movement of the user. The present invention is designed to enable the user to comfortably carry the injured person without impeding the movement of the user that may result in harm to the user, such as carrying the injured person down a flight of stairs. Another object of this invention is to provide a foldable survival stretcher that can be easily stored and deployed by the user during an emergency. The present invention can be stored on a portable storage structure, such as a storage bag, or stored at an accessible location for emergencies, such as next to a fire escape, so that the user can quickly retrieve the foldable survival stretcher and deploy the foldable survival stretcher to transport the injured person. Additional features and benefits of the present invention are further discussed in the sections below.

SUMMARY OF THE INVENTION

The present invention provides a foldable survival stretcher that enables a person to carry an injured person without assistance from another person. The present invention is designed to be used in different emergency situations including, but not limited to, a fire in a building, the bombing of a structure, during a combat situation, etc. Further, the main structure of the foldable survival stretcher is preferably made from ballistic nylon, the fabric with the strongest tensile strength available today. The term "ballistic nylon" originates in the fabric's intended function, protecting the wearer from flying debris and fragmentation caused by bullets and artillery shell impacts. Although ballistic nylon was originally created and used in flak jackets, its durability and cutting resistance have made the fabric useful for non-combat applications, such as being used in chainsaw protective chaps. Further, the fabric is 1680 denier so that the present invention can resist punctures/tears/scrapes while being dragged across rough terrain. Further, the threading of the foldable survival stretcher is treated with a fire-retardant material prior to the construction of the fabric. Further, the foldable survival stretcher is equipped with several straps and bands that hold the injured person against the foldable survival stretcher. These straps and bands can be preferably made from regular nylon for comfort to the injured person and can be secured using commercial-grade hook and loop fasteners. Further, the foldable survival stretcher preferably includes a pocket to safely retain the injured person's feet against the stretcher.

Furthermore, the present invention can be compactly folded into a lightweight storage bag so that the foldable survival stretcher is always readily available and functional at any location. Alternatively, the present invention can be stored in any compact storage device adjacent to an emergency location to be used in case of emergencies. To deploy the present invention, the user just removes the foldable survival stretcher from the sack, lays the foldable survival stretcher flat, unfastens the straps and bands, lays the injured person on the stretcher, tightly secures the injured person's body using the straps and bands, and then hoists the foldable survival stretcher up onto the user's back using the appropriate straps. This can be done in less than a minute so that the user can transport the injured person right away. Further, the user can walk freely to safety without obstruction of the injured person. The present invention also eliminates the use of both arms to balance the injured person on the user's back. This is extremely useful in various situations, such as in combat situations where the user's arms can be left free to hold supplies or a gun if in a danger zone. In alternate embodiments, the foldable survival stretcher can be provided as an inflatable structure that can be easily deployed using appropriate inflating mechanisms to provide additional comfort to the injured person being carried on the user's back.

DETAIL DESCRIPTIONS OF THE INVENTION

Figure 1:
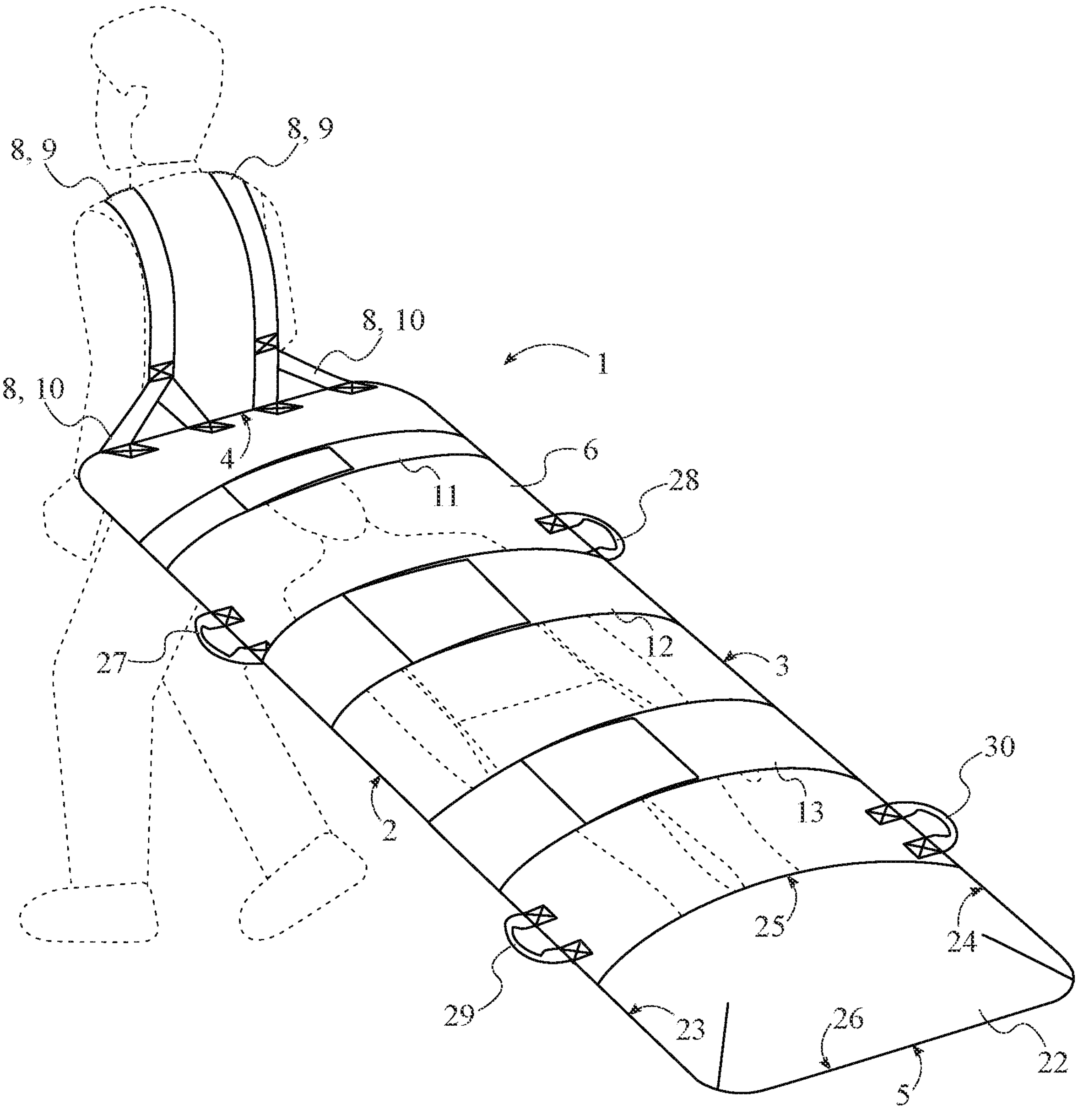
FIG. 1 is a top front perspective showing the present invention, wherein the present invention is shown being pulled by a user, and wherein the present invention is shown holding an injured person.
Figure 2:
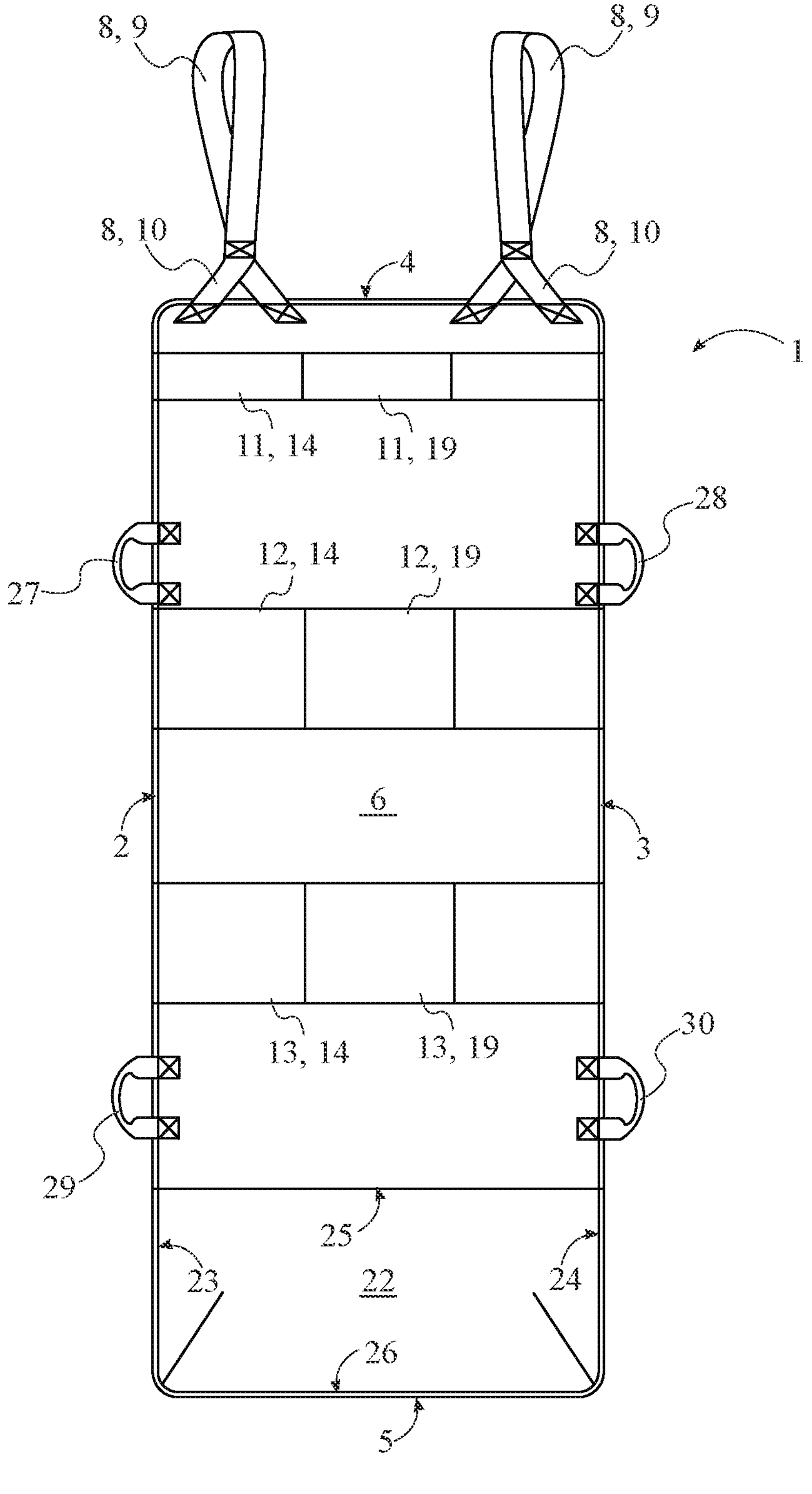
FIG. 2 is a front view of the present invention.
Figure 3:
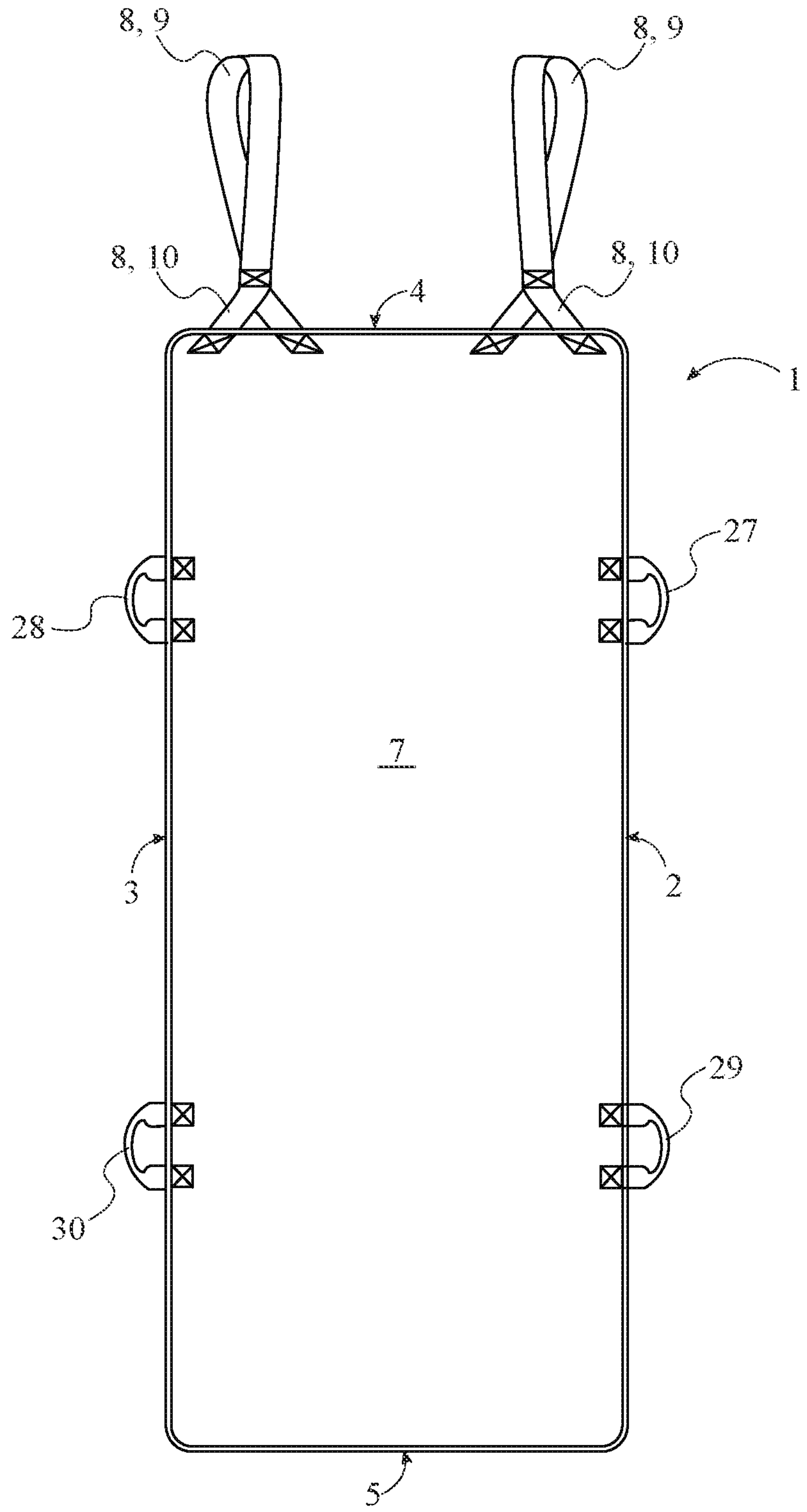
FIG. 3 is a rear view of the present invention.
Figure 4:
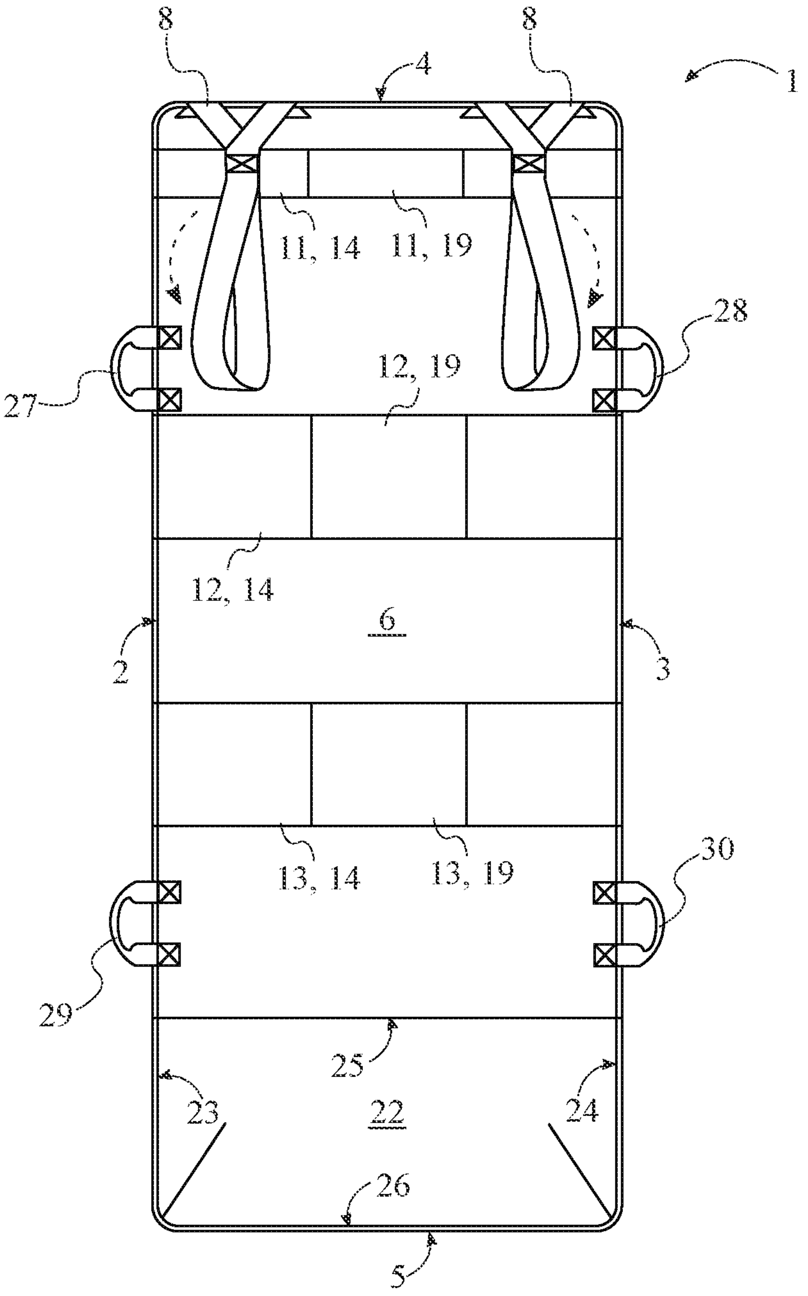
FIG. 4 is a front view of the present invention, wherein the pair of pulling straps are shown folded inwards for storage.
Figure 5:
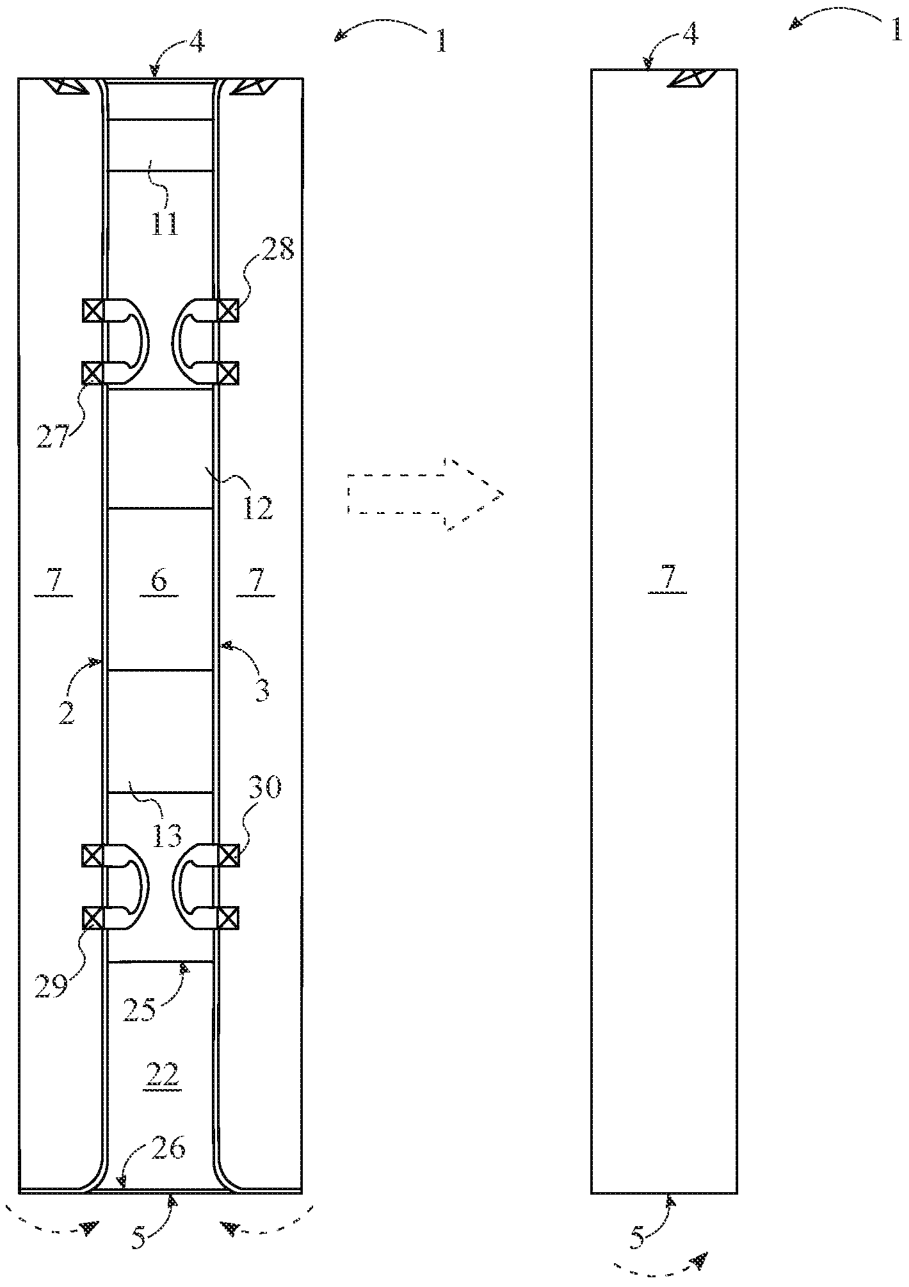
FIG. 5 is a front view of the present invention, wherein the present invention is shown folded vertically twice to reduce the overall width of the present invention for storage.
Figure 6:
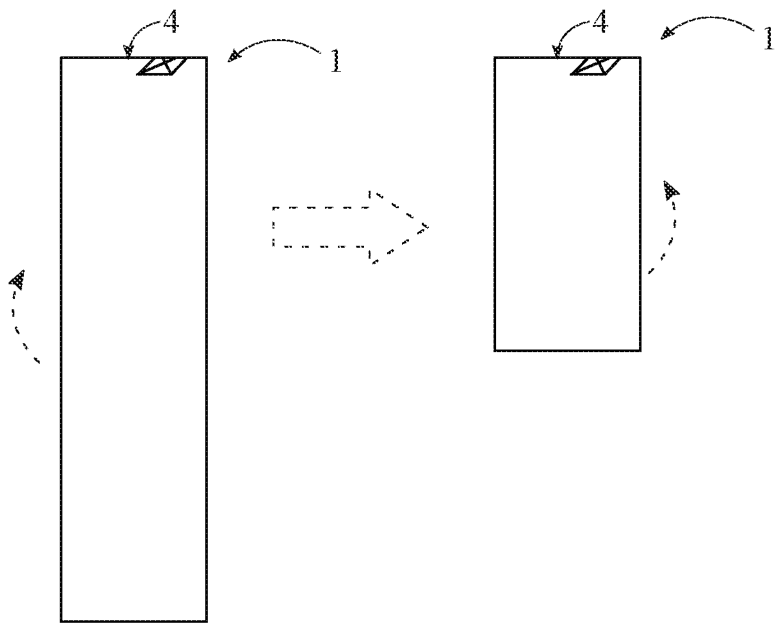
FIG. 6 is a front view of the present invention, wherein the present invention is shown folded horizontally twice to reduce the overall length of the present invention for storage.
Figure 7:
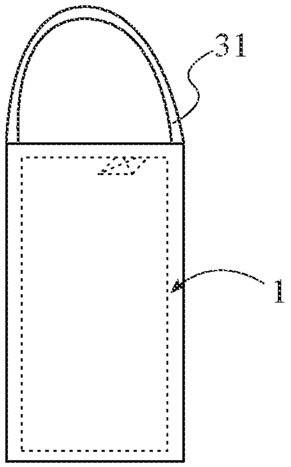
FIG. 7 is a front view of the present invention, wherein the present invention is shown stored within a stretcher bag for storage.
Figure 8:
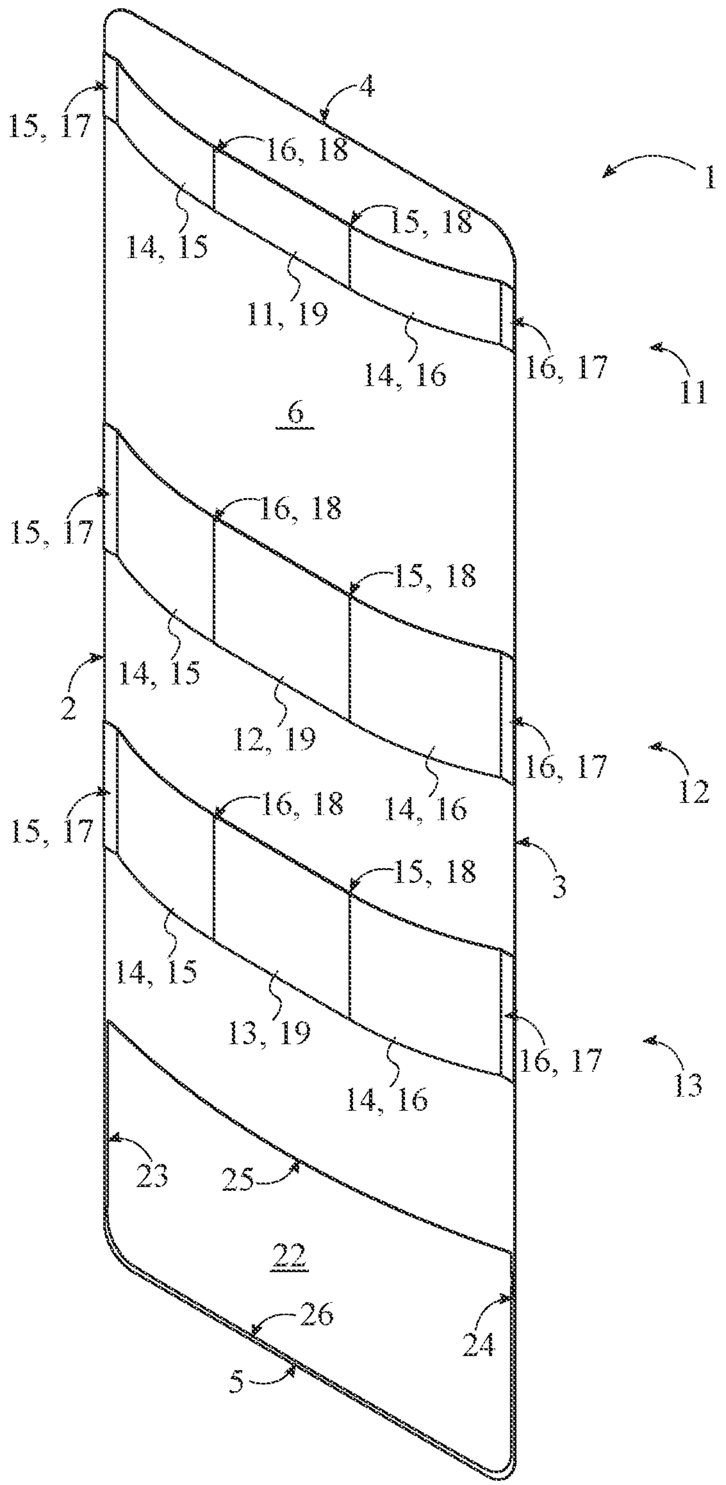
FIG. 8 is a top front perspective showing the present invention, wherein the present invention is shown without the pair of pulling straps, the first upper-body handle, the second upper-body handle, the first lower-body handle, and second lower-body handle.
Figure 9:
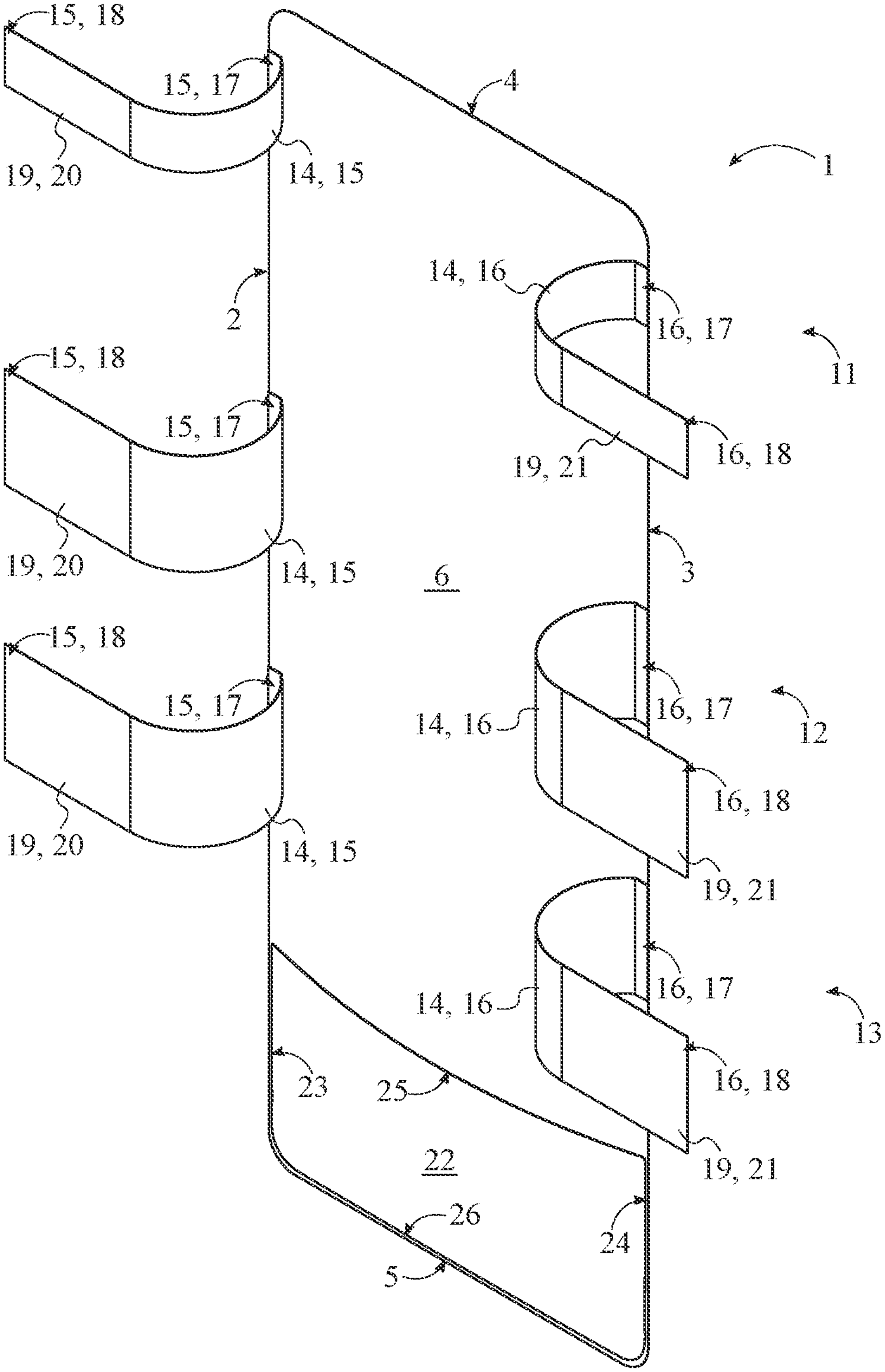
FIG. 9 is a top front perspective showing the present invention, wherein the present invention is shown with the head-restraining band, the chest-restraining band, and the pelvis-restraining band unfastened.

All illustrations of the drawings are for the purpose of describing selected versions of the present invention and are not intended to limit the scope of the present invention.

The present invention is a foldable survival stretcher that enables the user to carry an injured person who needs medical assistance without help from another person. The foldable survival stretcher is a practical stretcher that can be easily and quickly deployed so that the user can transport the injured person to safety in various emergency situations. As can be seen in FIGS. 1 through 9, the present invention comprises a stretcher canvas 1, a pair of pulling straps 8, a head-restraining band 11, a chest-restraining band 12, a pelvis-restraining band 13, and a feet-restraining pocket 22. The stretcher canvas 1 is a flat, flexible, and resilient structure able to support the injured person's body while the user carries the injured person using the present invention. The pair of pulling straps 8 enables the user to carry the injured person on the back in the same manner as wearing a backpack. The head-restraining band 11, the chest-restraining band 12, and the pelvis-restraining band 13 help secure the injured person's body to the stretcher canvas 1. In addition, the feet-restraining pocket 22 helps secure the injured person's feet to the stretcher canvas 1 so that the user is not worried about dropping the patient while transporting the injured person.

The general configuration of the aforementioned components enables a user to individually carry a person in need of medical attention without obstructing the movement of the user nor limiting the use of the user's hands. As can be seen in FIGS. 1 through 9, the present invention is preferably a flexible, resilient structure that can be folded into a compact structure for storage so that the user can comfortably carry the present invention to any location. For example, the present invention can be stored within a stretcher bag 31 for easy transportation of the present invention when not in use. Further, the compact storage structure of the present invention also enables the present invention to be easily stored at any location for emergency use, such as next to the fire escape of a building. To do so, the stretcher canvas 1 is designed to be flexible and resilient. The stretcher canvas 1 is preferably an overall rectangular, thin structure large enough to accommodate the body of the injured person. The stretcher canvas 1 can be provided in different sizes to accommodate people of different sizes. However, the stretcher canvas 1 can also be provided with a standard size that fits most people. For example, the stretcher canvas 1 may have a length of eighty inches with a width of thirty inches. Accordingly, the stretcher canvas 1 comprises a first lengthwise canvas edge 2, a second lengthwise canvas edge 3, a first widthwise canvas edge 4, a second widthwise canvas edge 5, a first canvas face 6, and a second canvas face 7. The first lengthwise canvas edge 2 and the second lengthwise canvas edge 3 preferably correspond to the longer opposite edges of the stretcher canvas 1. The first widthwise canvas edge 4 and the second widthwise canvas edge 5 preferably correspond to the shorter opposite edges of the stretcher canvas 1. Further, the first canvas face 6 and the second canvas face 7 correspond to the opposite flat surfaces of the stretcher canvas 1.

The present invention is preferably structured as follows. As can be seen in FIGS. 1 through 9, the pair of pulling straps 8 are connected along the first widthwise canvas edge 4 so that the stretcher canvas 1 can be pulled using the pair of pulling straps 8. The pair of pulling straps 8 enables the user to carry the injured person in the same manner as carrying a backpack. Further, the feet-restraining pocket 22 is connected across the first canvas face 6, adjacent to the second widthwise canvas edge 5, to restrain the feet of the injured person being carried by the user. Further, the head-restraining band 11 is connected in between the first lengthwise canvas edge 2 and the second lengthwise canvas edge 3, offset to the first widthwise canvas edge 4, to restrain the head of the injured person. Similarly, the pelvis-restraining band 13 is connected in between the first lengthwise canvas edge 2 and the second lengthwise canvas edge 3, offset to the feet-restraining pocket 22, to restrain the pelvis area of the injured person against the stretcher canvas 1. Further, the chest-restraining band 12 is positioned in between the head-restraining band 11 and the pelvis-restraining band 13 to offset the chest-restraining band 12 from the head-restraining band 11 and the pelvis-restraining band 13. Furthermore, the chest-restraining band 12 is connected in between the first lengthwise canvas edge 2 and the second lengthwise canvas edge 3, offset to the head-restraining band 11 and the pelvis-restraining band 13, to restrain the chest area of the injured person against the stretcher canvas 1. This way, the body of the injured person is safely secured to the stretcher canvas 1 while the user is pulling on the stretcher canvas 1 using the pair of pulling straps 8.

In the preferred embodiment, the stretcher canvas 1 is made of a laminated ballistic nylon fabric that protects the injured person as well as the user carrying the injured person. In addition, the laminated ballistic nylon fabric adds resilience to the stretcher canvas 1 to prevent ruptures or tears on the stretcher canvas 1 as the user carries the injured person across rough terrain. Furthermore, the stretcher canvas 1 color can be a standard dark color such as jet black. In other embodiments, different materials, patterns, and designs can be utilized for the stretcher canvas 1. Further, the present invention can be easily stored as follows. As can be seen in FIGS. 4 through 7, the user first folds the pair of pulling straps 8 towards the first canvas face 6. Then, the user folds the stretcher canvas 1 vertically to reduce the overall width of the stretcher canvas 1 by folding the first lengthwise canvas edge 4 and the second lengthwise canvas edge 5 towards the first canvas face 6 once. Then, the stretcher canvas 1 is folded vertically again by folding the vertical halves of the folded stretcher canvas 1 towards each other. Afterwards, the user reduces the overall length of the stretcher canvas 1 by folding the stretcher canvas 1 in half twice. As a result, the present invention is reduced in size to a small rectangular folded structure that can be stored away in a stretcher bag 31 for easy transportation of the present invention or other suitable carrier. Alternatively, the present invention can be stored away in a storage space that is positioned adjacent to emergency locations, such as the fire escape of a building.

In addition to enabling the user to carry the injured person from the user's back using the pair of pulling straps 8, the present invention can provide other means for the user or other people to support the injured person being carried on the stretcher canvas 1. As can be seen in FIGS. 1 through 4, in one embodiment, the present invention may further comprise a first upper-body handle 27, a second upper-body handle 28, a first lower-body handle 29, and a second lower-body handle 30. The first upper-body handle 27, the second upper-body handle 28, the first lower-body handle 29, and the second lower-body handle 30 enable the user or multiple users to carry the injured person on the stretcher canvas 1 in the same way as traditional stretchers. The handles also enable other users to help the user carry the injured person for faster transportation of the injured person. To do so, the first upper-body handle 27 and the first lower-body handle 29 are connected along the first lengthwise canvas edge 2 to secure the first upper-body handle 27 and the first lower-body handle 29 to the stretcher canvas 1. Similarly, the second upper-body handle 28 and the second lower-body handle 30 are connected along the second lengthwise canvas edge 3 to secure the second upper-body handle 28 and the second lower-body handle 30 to the stretcher canvas 1. Further, the first upper-body handle 27 and the second upper-body handle 28 are positioned opposite to each other across the stretcher canvas 1.

As can be seen in FIG. 1 through, in addition, the first upper-body handle 27 and the second upper-body handle 28 are positioned in between the head-restraining band 11 and the chest-restraining band 12. This way, the first upper-body handle 27 and the second upper-body handle 28 can be used to provide additional support to the upper body of the injured person. Similarly, the first lower-body handle 29 and the second lower-body handle 30 are positioned opposite to each other across the stretcher canvas 1. However, the first lower-body handle 29 and the second lower-body handle 30 are positioned in between the pelvis-restraining band 13 and the feet-restraining pocket 22. This way, the first lower-body handle 29 and the second lower-body handle 30 can be used to provide additional support to the lower body of the injured person. In other embodiments, additional handles can be provided along the lengthwise canvas edges of the stretcher canvas 1. In the preferred embodiment, the first upper-body handle 27, the second upper-body handle 28, the first lower-body handle 29, and the second lower-body handle 30 each are a fabric strap handle. The length of each handle is preferably seven and a half inches to provide enough space to accommodate the user's hands. The distance between the handles on each lengthwise edge is preferably thirty inches between each handle. Furthermore, each handle is preferably made from nylon webbing with a width of one and a half inches. In other embodiments, different materials and sizes can be utilized for each handle.

As previously discussed, the pair of pulling straps 8 enables the user to hang the injured person on the stretcher canvas 1 from the back of the user so that the user is free to move without having to hold onto the injured person. As can be seen in FIG. 1 through 4, the pair of pulling straps 8 are designed to fit over the shoulders of the user so that the weight of the injured person hangs from the back of the user. Accordingly, each pair of pulling straps 8 may comprise a looped pulling-strap portion 9 and an anchoring pulling-strap portion 10. The looped pulling-strap portion 9 preferably corresponds to the portion of the pulling strap that fits around the shoulder of the user. The anchoring pulling-strap portion 10 corresponds to the portion that is secured to the stretcher canvas 1. So, the anchoring pulling-strap portion 10 is connected onto the stretcher canvas 1, adjacent to the first widthwise canvas edge 4, to secure the looped pulling-strap portion 9 to the stretcher canvas 1. Further, the looped pulling-strap portion 9 is positioned offset from the first widthwise canvas edge 4 to leave enough space to accommodate the user's shoulders. This way, the user can insert both arms through the corresponding looped pulling-strap portion 9 of the pulling straps so that that portion of the stretcher canvas 1 adjacent to the first widthwise canvas edge 4 is pulled up against the user's back, which corresponds to the area that restrains the injured person's head. Thus, the user can safely carry the injured person on the user's back without compromising the user's movement or further endangering the injured person. In other embodiments, the pair of pulling straps 8 may be replaced with other means to secure the stretcher canvas 1 to the user's back without limiting the user's movement.

While the user is transporting the injured patient using the present invention, the present invention ensures that the injured person does not fall off the stretcher canvas 1 due to the head-restraining band 11, the chest-restraining band 12, and the pelvis-restraining band 13. To secure the injured person to stretcher canvas 1, the head-restraining band 11, the chest-restraining band 12, and the pelvis-restraining band 13 are designed to be selectively fastened around the injured person's body without harming the injured person. As can be seen in FIGS. 1 through 4, 8, and 9, the head-restraining band 11, the chest-restraining band 12, and the pelvis-restraining band 13 may each comprise a disjointed band body 14 and an attachment mechanism 19. The disjointed band body 14 corresponds to the portion of each band that can be selectively fastened or unfastened using the attachment mechanism 19. The attachment mechanism 19 keeps the disjointed band body 14 secure when restraining the injured person's body against the stretcher canvas 1. To do so, the disjointed band body 14 comprises a first band section 15 and a second band section 16 that can be unfastened when placing the injured person's body on the stretcher canvas 1 and then fastened to secure the injured person's body to the stretcher canvas 1. Further, the first band section 15 and the second band section 16 each comprise a fixed section end 17 and a free section end 18 corresponding to the terminal ends of each band section.

As can be seen in FIGS. 1 through 4, 8, and 9, the fixed section end 17 of the first band section 15 is connected onto the first lengthwise canvas edge 2 to secure the first band section 15 to the first lengthwise canvas edge 4. Similarly, the fixed section end 17 of the second band section 16 is connected onto the second lengthwise canvas edge 3 to secure the second band section 16 to the second lengthwise canvas edge 3. Then, to fasten each disjointed band body 14 around the injured person, the attachment mechanism 19 is operatively integrated in between the free section end 18 of the first band section 15 and the free section end 18 of the second band section 16. This way, the attachment mechanism 19 can be used to adjust an overall length of the disjointed band body 14 and to readily attach and detach the first band section 15 to the second band section 16. Further, the disjointed band body 14 is preferably made from laminated nylon. The disjointed band body 14 of the head-restraining band 11 may also be made from nylon webbing. However, other materials may be utilized as necessary.

In some embodiments, the attachment mechanism 19 can include two intercoupling pieces that can be coupled to each other to form a secure connection. As can be seen in FIGS. 1 through 4, 8, and 9, the attachment mechanism 19 may comprise a first interlocking piece 20 and a second interlocking piece 21 that can be selectively coupled to secure the desired disjointed band body 14. Accordingly, the first interlocking piece 20 is connected onto the first band section 15, adjacent to the free section end 18 of the first band section 15, to secure the first interlocking piece 20 to the first band section 15. Similarly, the second interlocking piece 21 is connected onto the second band section 16, adjacent to the free section end 18 of the second band section 16, to secure the second interlocking piece 21 to the second band section 16. Then, to fasten the first band section 15 to the second band section 16, the first interlocking piece 20 and the second interlocking piece 21 are engaged to each other. This way, the user can fasten each disjointed band body 14 as necessary to tightly secure the injured person to the stretcher canvas 1 without causing discomfort to the injured person. Furthermore, various attachment mechanisms 19 can be utilized that are comfortable to wear and keep the injured person secure to the stretcher canvas 1. For example, the first interlocking piece 20 and the second interlocking piece 21 are corresponding pieces of a hook-and-loop fastener. However, other attachment mechanisms 19 can be utilized that keep the injured person safe against the stretcher canvas 1.

In addition to the head-restraining band 11, the chest-restraining band 12, and the pelvis-restraining band 13, the feet-restraining pocket 22 further helps maintain the injured person's body on the stretcher canvas 1 while being transported by the user. To safely retain the injured person's feet, the feet-restraining pocket 22 is designed with a structure large enough to receive the feet without unnecessarily restraining the feet. Further, the feet-restraining pocket 22 is designed to match the design of the stretcher canvas 1. As can be seen in FIGS. 1 through 4, 8, and 9, the feet-restraining pocket 22 may comprise a first lengthwise pocket edge 23, a second lengthwise pocket edge 24, a first widthwise pocket edge 25, and a second widthwise pocket edge 26. The first lengthwise pocket edge 23 and the second lengthwise pocket edge 24 preferably correspond to the opposite lateral edges of the feet-restraining pocket 22. The first widthwise pocket edge 25 and the second widthwise pocket edge 26 correspond to the opposite edges that match the width of the stretcher canvas 1. Further, the first lengthwise pocket edge 23 is connected along the first lengthwise canvas edge 2 to secure the feet-restraining pocket 22 to the first lengthwise canvas edge 2. Similarly, the second lengthwise pocket edge 24 is connected along the second lengthwise canvas edge 3 to secure the feet-restraining pocket 22 to the second lengthwise canvas edge 3. Further, the first widthwise pocket edge 25 is positioned offset from the first canvas face 6 and is left free to serve as the opening of the feet-restraining pocket 22. On the other hand, the second widthwise pocket edge 26 is connected along the second widthwise canvas edge 5 to secure the feet-restraining pocket 22 to the second widthwise canvas edge 5. This way, a restraining space is formed within the feet-restraining pocket 22 to receive the injured person's feet. In other embodiments, different mechanisms can be utilized to restrain the injured person's feet.

The present invention can be applied to different emergency situations. For example, the present invention can be made mandatory to be placed adjacent to fire escapes and emergency exits of a building such as an apartment complex or hospitals. Many physically challenged individuals are now enjoying a larger part of their community as most public buildings now offer ramps for easy accessibility. However, once a fire, bombing, or threat has been made to a publicly accessed building, the elevators are shut down. Wheelchairs are no longer a viable solution for escape, but the present invention would enable physically challenged individuals to be evacuated. Furthermore, the present invention can be greatly beneficial in combat situations. When a fellow soldier is injured in combat to the point of incapacity, the present invention can greatly increase the soldier's chance of survival. The present invention can facilitate the fellow soldier's extraction and allows the soldier performing the extraction to defend themselves by freeing the soldier's arms to carry a weapon for self-defense. In addition, the present invention can be carried along with in dangerous activities such as adventure hikes that take people into deep forests, over rocky streams, up large hills etc. Terrain that can easily cause a sprained ankle or a fall that would incur injuries that limit ambulation in remote areas.

Furthermore, in alternate embodiments, the present invention can be provided as an inflatable structure that can be deployed to comfortably carry the injured person. In this embodiment, the stretcher canvas 1 can be an inflatable canvas that includes several inflatable chambers that are fastened together to form an inflatable rectangular structure. The stretcher canvas 1 may also include at least one valve that can be used to inflate the inflatable stretcher canvas 1. Further, the present invention may provide means to quickly inflate the stretcher canvas 1. For example, the present invention may provide at least one canister of pressurized fluid, such as compressed air, that is in fluid communication with the stretcher canvas 1 by the at least one valve. The at least one canister may be carried along with the present invention in the storage bag 31 or provided in the same storage space as the present invention. This way, the user can easily deploy the present invention by engaging the at least one valve so that the stored fluid within the at least one canister quickly flows into the inflatable chambers of the stretcher canvas 1. Thus, the stretcher canvas 1 is quickly inflated and ready to use. In other embodiments, the stretcher canvas 1 may include different structural designs that increase the comfort and protect the injure person being carried by the user.

Although the invention has been explained in relation to its preferred embodiment, it is to be understood that many other possible modifications and variations can be made without departing from the spirit and scope of the invention.

What is claimed is:

1. A foldable survival stretcher comprising:

a stretcher canvas;

a pair of pulling straps;

a head-restraining band;

a chest-restraining band;

a pelvis-restraining band;

a feet-restraining pocket;

the stretcher canvas comprising a first lengthwise canvas edge, a second lengthwise canvas edge, a first widthwise canvas edge, a second widthwise canvas edge, a first canvas face, and a second canvas face;

each of the pair of pulling straps comprising a looped pulling-strap portion and an anchoring pulling-strap portion;

the pair of pulling straps being connected along the first widthwise canvas edge;

the feet-restraining pocket being connected across the first canvas face, adjacent to the second widthwise canvas edge;

the head-restraining band being connected in between the first lengthwise canvas edge and the second lengthwise canvas edge, offset to the first widthwise canvas edge;

the pelvis-restraining band being connected in between the first lengthwise canvas edge and the second lengthwise canvas edge, offset to the feet-restraining pocket;

the chest-restraining band being connected in between the first lengthwise canvas edge and the second lengthwise canvas edge, offset to the head-restraining band and the pelvis-restraining band;

the chest-restraining band being positioned in between the head-restraining band and the pelvis-restraining band;

the head-restraining band being configured to exclusively brace a user's forehead against the first canvas face;

the chest-restraining band being configured to exclusively brace the user's chest region against the first canvas face;

the pelvis-restraining band being configured to exclusively brace the user's pelvic region against the first canvas face;

the stretcher canvas being made of a laminated ballistic nylon fabric;

the anchoring pulling-strap portion being connected onto the stretcher canvas, adjacent to the first widthwise canvas edge; and the looped pulling-strap portion being positioned offset from the first widthwise canvas edge.

2. The foldable survival stretcher as claimed in claim 1, wherein the stretcher canvas is foldably arranged into a collapsed configuration, and wherein the stretcher canvas in the collapsed configuration is positioned within a stretcher bag.

3. The foldable survival stretcher as claimed in claim 1 comprising:

a first upper-body handle;

a second upper-body handle;

a first lower-body handle;

a second lower-body handle;

the first upper-body handle and the first lower-body handle being connected along the first lengthwise canvas edge;

the second upper-body handle and the second lower-body handle being connected along the second lengthwise canvas edge;

the first upper-body handle and the second upper-body handle being positioned opposite to each other across the stretcher canvas;

the first upper-body handle and the second upper-body handle being positioned in between the head-restraining band and the chest-restraining band;

the first lower-body handle and the second lower-body handle being positioned opposite to each other across the stretcher canvas; and the first lower-body handle and the second lower-body handle being positioned in between the pelvis-restraining band and the feet-restraining pocket.

4. The foldable survival stretcher as claimed in claim 3, wherein the first upper-body handle, the second upper-body handle, the first lower-body handle, and the second lower-body handle each are a fabric strap handle.

5. The foldable survival stretcher as claimed in claim 1 comprising:

the head-restraining band, the chest-restraining band, and the pelvis-restraining band each comprising a disjointed band body and an attachment mechanism;

the disjointed band body comprising a first band section and a second band section;

the first band section and the second band section each comprising a fixed section end and a free section end;

the fixed section end of the first band section being connected onto the first lengthwise canvas edge;

the fixed section end of the second band section being connected onto the second lengthwise canvas edge; and the attachment mechanism being operatively integrated in between the free section end of the first band section and the free section end of the second band section, wherein the attachment mechanism is used to adjust an overall length of the disjointed band body and to readily attach and detach the first band section to the second band section.

6. The foldable survival stretcher as claimed in claim 5 comprising:

the attachment mechanism comprising a first interlocking piece and a second interlocking piece;

the first interlocking piece being connected onto the first band section, adjacent to the free section end of the first band section;

the second interlocking piece being connected onto the second band section, adjacent to the free section end of the second band section; and the first interlocking piece and the second interlocking piece being engaged to each other.

7. The foldable survival stretcher as claimed in claim 6, wherein the first interlocking piece and the second interlocking piece are corresponding pieces of a hook-and-loop fastener.

8. The foldable survival stretcher as claimed in claim 1 comprising:

the feet-restraining pocket comprising a first lengthwise pocket edge, a second lengthwise pocket edge, a first widthwise pocket edge, and a second widthwise pocket edge;

the first lengthwise pocket edge being connected along the first lengthwise canvas edge;

the second lengthwise pocket edge being connected along the second lengthwise canvas edge;

the first widthwise pocket edge being positioned offset from the first canvas face; and the second widthwise pocket edge being connected along the second widthwise canvas edge.

9. A foldable survival stretcher comprising:

a stretcher canvas;

a pair of pulling straps;

a head-restraining band;

a chest-restraining band;

a pelvis-restraining band;

a feet-restraining pocket;

a first upper-body handle;

a second upper-body handle;

a first lower-body handle;

a second lower-body handle;

the stretcher canvas comprising a first lengthwise canvas edge, a second lengthwise canvas edge, a first widthwise canvas edge, a second widthwise canvas edge, a first canvas face, and a second canvas face;

each of the pair of pulling straps comprising a looped pulling-strap portion and an anchoring pulling-strap portion;

the pair of pulling straps being connected along the first widthwise canvas edge;

the feet-restraining pocket being connected across the first canvas face, adjacent to the second widthwise canvas edge;

the head-restraining band being connected in between the first lengthwise canvas edge and the second lengthwise canvas edge, offset to the first widthwise canvas edge;

the pelvis-restraining band being connected in between the first lengthwise canvas edge and the second lengthwise canvas edge, offset to the feet-restraining pocket;

the chest-restraining band being connected in between the first lengthwise canvas edge and the second lengthwise canvas edge, offset to the head-restraining band and the pelvis-restraining band;

the chest-restraining band being positioned in between the head-restraining band and the pelvis-restraining band;

the first upper-body handle and the first lower-body handle being connected along the first lengthwise canvas edge;

the second upper-body handle and the second lower-body handle being connected along the second lengthwise canvas edge;

the first upper-body handle and the second upper-body handle being positioned opposite to each other across the stretcher canvas;

the first upper-body handle and the second upper-body handle being positioned in between the head-restraining band and the chest-restraining band;

the first lower-body handle and the second lower-body handle being positioned opposite to each other across the stretcher canvas;

the first lower-body handle and the second lower-body handle being positioned in between the pelvis-restraining band and the feet-restraining pocket;

the head-restraining band being configured to exclusively brace a user's forehead against the first canvas face;

the chest-restraining band being configured to exclusively brace the user's chest region against the first canvas face;

the pelvis-restraining band being configured to exclusively brace the user's pelvic region against the first canvas face;

the stretcher canvas being made of a laminated ballistic nylon fabric;

the anchoring pulling-strap portion being connected onto the stretcher canvas, adjacent to the first widthwise canvas edge; and the looped pulling-strap portion being positioned offset from the first widthwise canvas edge.

10. The foldable survival stretcher as claimed in claim 9 comprising:

the first upper-body handle, the second upper-body handle, the first lower-body handle, and the second lower-body handle each being a fabric strap handle.

11. The foldable survival stretcher as claimed in claim 9, wherein the stretcher canvas is foldably arranged into a collapsed configuration, and wherein the stretcher canvas in the collapsed configuration is positioned within a stretcher bag.

12. The foldable survival stretcher as claimed in claim 9 comprising:

the head-restraining band, the chest-restraining band, and the pelvis-restraining band each comprising a disjointed band body and an attachment mechanism;

the disjointed band body comprising a first band section and a second band section;

the first band section and the second band section each comprising a fixed section end and a free section end;

the fixed section end of the first band section being connected onto the first lengthwise canvas edge;

the fixed section end of the second band section being connected onto the second lengthwise canvas edge; and the attachment mechanism being operatively integrated in between the free section end of the first band section and the free section end of the second band section, wherein the attachment mechanism is used to adjust an overall length of the disjointed band body and to readily attach and detach the first band section to the second band section.

13. The foldable survival stretcher as claimed in claim 12 comprising:

the attachment mechanism comprising a first interlocking piece and a second interlocking piece;

the first interlocking piece being connected onto the first band section, adjacent to the free section end of the first band section;

the second interlocking piece being connected onto the second band section, adjacent to the free section end of the second band section;

the first interlocking piece and the second interlocking piece being engaged to each other; and the first interlocking piece and the second interlocking piece being corresponding pieces of a hook-and-loop fastener.

14. The foldable survival stretcher as claimed in claim 9 comprising:

the feet-restraining pocket comprising a first lengthwise pocket edge, a second lengthwise pocket edge, a first widthwise pocket edge, and a second widthwise pocket edge;

the first lengthwise pocket edge being connected along the first lengthwise canvas edge;

the second lengthwise pocket edge being connected along the second lengthwise canvas edge;

the first widthwise pocket edge being positioned offset from the first canvas face; and the second widthwise pocket edge being connected along the second widthwise canvas edge.

15. A foldable survival stretcher comprising:

a stretcher canvas;

a pair of pulling straps;

a head-restraining band;

a chest-restraining band;

a pelvis-restraining band;

a feet-restraining pocket;

a first upper-body handle;

a second upper-body handle;

a first lower-body handle;

a second lower-body handle;

the stretcher canvas comprising a first lengthwise canvas edge, a second lengthwise canvas edge, a first widthwise canvas edge, a second widthwise canvas edge, a first canvas face, and a second canvas face;

each of the pair of pulling straps comprising a looped pulling-strap portion and an anchoring pulling-strap portion;

the head-restraining band, the chest-restraining band, and the pelvis-restraining band each comprising a disjointed band body and an attachment mechanism;

the disjointed band body comprising a first band section and a second band section;

the attachment mechanism comprising a first interlocking piece and a second interlocking piece;

the first band section and the second band section each comprising a fixed section end and a free section end;

the pair of pulling straps being connected along the first widthwise canvas edge;

the feet-restraining pocket being connected across the first canvas face, adjacent to the second widthwise canvas edge;

the head-restraining band being connected in between the first lengthwise canvas edge and the second lengthwise canvas edge, offset to the first widthwise canvas edge;

the pelvis-restraining band being connected in between the first lengthwise canvas edge and the second lengthwise canvas edge, offset to the feet-restraining pocket;

the chest-restraining band being connected in between the first lengthwise canvas edge and the second lengthwise canvas edge, offset to the head-restraining band and the pelvis-restraining band;

the chest-restraining band being positioned in between the head-restraining band and the pelvis-restraining band;

the first upper-body handle and the first lower-body handle being connected along the first lengthwise canvas edge;

the second upper-body handle and the second lower-body handle being connected along the second lengthwise canvas edge;

the first upper-body handle and the second upper-body handle being positioned opposite to each other across the stretcher canvas;

the first upper-body handle and the second upper-body handle being positioned in between the head-restraining band and the chest-restraining band;

the first lower-body handle and the second lower-body handle being positioned opposite to each other across the stretcher canvas;

the first lower-body handle and the second lower-body handle being positioned in between the pelvis-restraining band and the feet-restraining pocket;

the head-restraining band being configured to exclusively brace a user's forehead against the first canvas face;

the chest-restraining band being configured to exclusively brace the user's chest region against the first canvas face;

the pelvis-restraining band being configured to exclusively brace the user's pelvic region against the first canvas face;

the stretcher canvas being made of a laminated ballistic nylon fabric;

the anchoring pulling-strap portion being connected onto the stretcher canvas, adjacent to the first widthwise canvas edge;

the looped pulling-strap portion being positioned offset from the first widthwise canvas edge;

the fixed section end of the first band section being connected onto the first lengthwise canvas edge;

the fixed section end of the second band section being connected onto the second lengthwise canvas edge;

the first interlocking piece being connected onto the first band section, adjacent to the free section end of the first band section;

the second interlocking piece being connected onto the second band section, adjacent to the free section end of the second band section;

the first interlocking piece and the second interlocking piece being engaged to each other; and the first interlocking piece and the second interlocking piece being corresponding pieces of a hook-and-loop fastener.

16. The foldable survival stretcher as claimed in claim 15 comprising:

the first upper-body handle, the second upper-body handle, the first lower-body handle, and the second lower-body handle each being a fabric strap handle.

17. The foldable survival stretcher as claimed in claim 15, wherein the stretcher canvas is foldably arranged into a collapsed configuration, and wherein the stretcher canvas in the collapsed configuration is positioned within a stretcher bag.

18. The foldable survival stretcher as claimed in claim 15 comprising:

the feet-restraining pocket comprising a first lengthwise pocket edge, a second lengthwise pocket edge, a first widthwise pocket edge, and a second widthwise pocket edge;

the first lengthwise pocket edge being connected along the first lengthwise canvas edge;

the second lengthwise pocket edge being connected along the second lengthwise canvas edge;

the first widthwise pocket edge being positioned offset from the first canvas face; and the second widthwise pocket edge being connected along the second widthwise canvas edge.

* * * * *